March 22, 1966      W. H. FIELDS      3,241,314

GAS TURBINE POWER PLANT

Filed July 29, 1963

United States Patent Office 3,241,314
Patented Mar. 22, 1966

3,241,314
GAS TURBINE POWER PLANT
William Henry Fields, Ansty, Coventry, England, assignor to Bristol Siddeley Engines Limited, Bristol, England
Filed July 29, 1963, Ser. No. 298,161
Claims priority, application Great Britain, Aug. 2, 1962, 29,677/62
1 Claim. (Cl. 60—39.15)

The invention relates to gas turbine power plant for supplying shaft power, for example for driving an electrical generator. Objects of the invention include the provision of a plant which can quickly be brought to full power output from rest and a plant which can be assembled from a plurality of units according to the power output required.

According to the invention, a gas turbine power plant includes a plurality of power units, each comprising at least one power turbine, arranged to be supplied separately with working fluid from its own gas generator; a single shaft on which the turbine is, or all the turbines of a unit are mounted, the shaft having a flexible coupling at at least one end thereof, whereby the shaft can be drivingly coupled to a shaft to be driven by the power plant or to a shaft of an adjacent unit, the turbines of all the units, when the shafts thereof are coupled together, being substantially coaxial with respect to each other, a delivery duct connecting each gas generator with the associated turbine, supporting means for the shaft of the unit, and supporting means for each gas generator, whereby the latter is permitted to move bodily in directions parallel to the axis of said shaft to accommodate axial movement of the associated turbine and to move bodily in a direction to accommodate its own thermal expansion and contraction.

Conveniently, each gas generator is a gas turbine jet propulsion engine, which may be arranged with its longitudinal axis in a plane at right angles to the axis of rotation of the shaft of the associated turbine.

The supporting means for each of said gas turbine jet propulsion engines conveniently comprises a cradle in which the engine is mounted, the cradle being suspended from a fixed structure to permit bodily movement of the engine and the cradle in direction towards and away from the axis of rotation of the shaft of the associated turbine, in order to accommodate thermal expansion and contraction of the gas generator, and also bodily movement of the engine and the cradle in directions parallel with the axis of rotation of the turbine shaft, in order to accommodate axial movement of the casing of the associated turbine relatively to the shaft due to thermal expansion and contraction thereof.

A plurality of units may be arranged with the shafts of the units coupled together end-to-end, one end of the coupled shafts being coupled to the adjacent end of a shaft to be driven by the plant. For example, where a shaft of an electrical generator is to be driven, the units may be positioned end-to-end at one end of the generator.

Alternatively, one or more units may be arranged at each end of a shaft to be driven by the plant, the shafts of all the units and the driven shaft being coupled together end-to-end. For example, where a shaft of an electrical generator is to be driven, one or more units may be arranged at each end of the generator.

Each units may include a thrust bearing to accommodate the axial thrust exerted by the turbine or turbines; but conveniently a common thrust bearing for withstanding the combined axial thrust exerted by the turbines on the shafts of several or all the units may be provided.

Where a unit includes at least two turbines, the latter may be of the same hand; but alternatively at least one of the turbines of a unit may be of the opposite hand to the remaining turbine or turbines of the same unit, whereby the resultant end thrust produced, and hence the size of the thrust bearing required, will be smaller than where all the turbines are of the same hand. For example, where each unit includes a pair of turbines mounted on a common shaft, these may be of opposite hands. Alternatively, the power plant may include at least one pair of units, the turbine or turbines of one unit being of one hand and the turbine or turbines of the other unit being of the opposite hand.

Another feature of the power plant according to the invention is that a gear box may be provided at one position along the length of the coupled shafts, whereby the latter can be driven by an auxiliary motor during shutdown of the plant and whereby the coupled shafts during operation of the plant will drive accessories common to all the turbines.

A gas turbine power plant for driving an electrical generator will now be described with reference to the accompanying drawings, in which.

Figure 1:
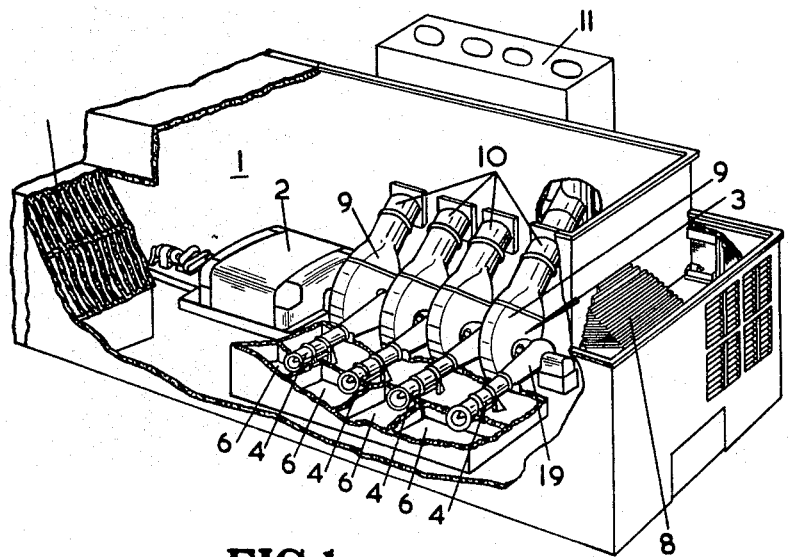
FIGURE 1 is a perspective diagrammatic fregmentary view of a power station including the plant.

The power station shown in FIGURES 1 and 2 includes a hull 1 which contains an A.C. generator 2 and four turbine 3 arranged with their shafts in line and drivingly coupled to the rotor of the generator 2 as will hereinafter be described. The turbines 3 each receive hot gases separately from one of four gas turbine engines 4, constituting the aforesaid gas generators. The engines 4 are aircraft jet propulsion engines of known type and include their own compressor-driving turbines, not shown. The turbines 3 are power turbines which are mechanically independent of the turbines of the engines and herein are referred to simply as "the turbines." Each engine 4 receives air from air intake chambers 6, each supplied separately by air drawn from outside the building through louvred intakes 7 positioned at each end of the building, sound absorbent splitters and guiding walls 8. The exhaust gases from each turbine 3 leave through a volute casing 9, connected by an exhaust duct 10 to an exhaust stack 11.

Figure 2:
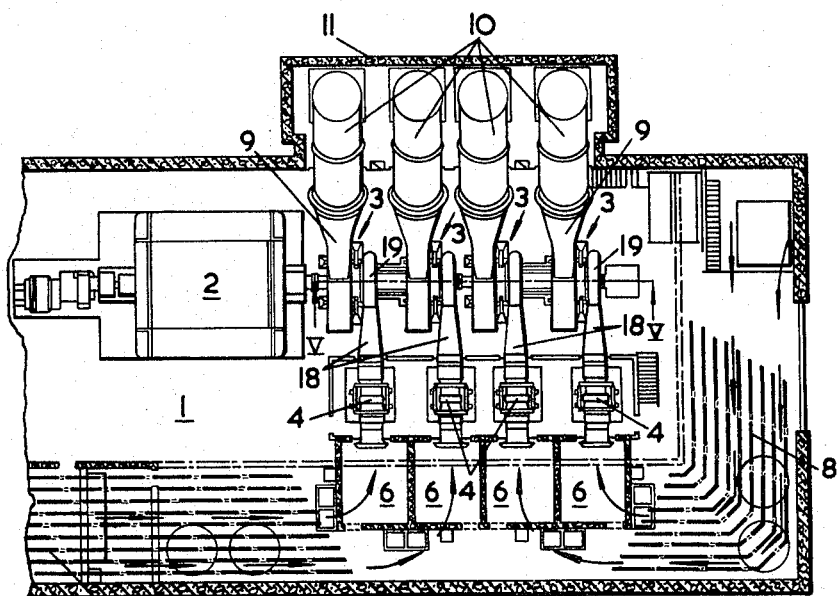
FIGURE 2 is a horizontal sectional view, to a larger scale, through the power station shown in FIGURE 1.
Figure 3:
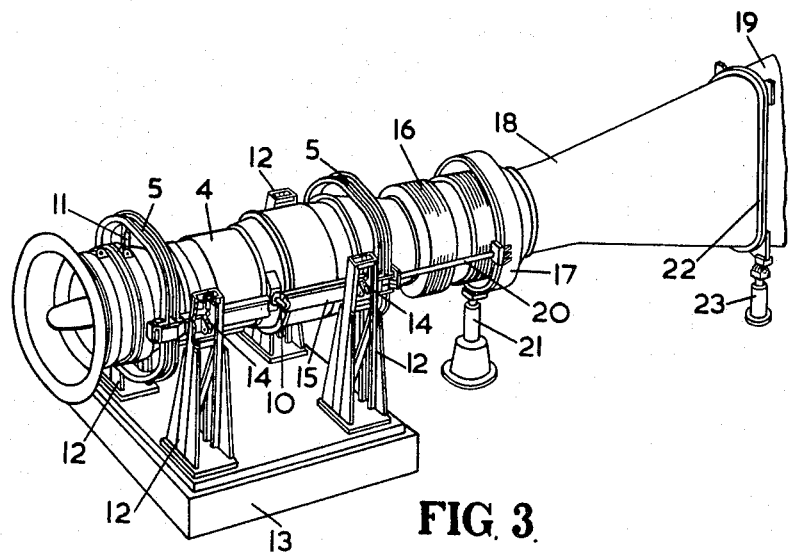
FIGURE 3 is a perspective view, to a larger scale, of one of the gas turbine jet propulsion engines employed as a gas generator and shown in FIGURES 1 and 2.
Figure 4:
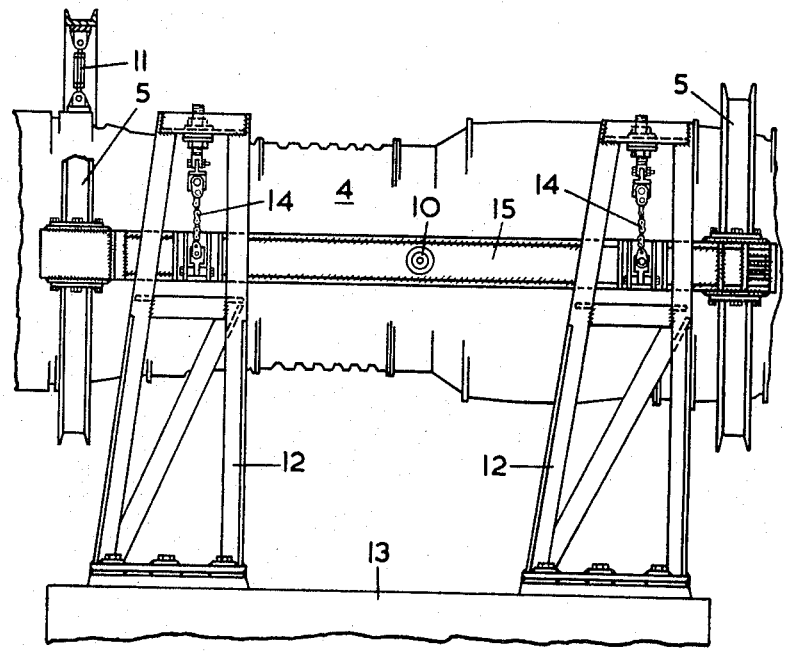
FIGURE 4 is a side elevation to a larger scale of the supporting means for the gas generator shown in FIGURE 3.

In accordance with the invention, each engine is arranged with its longitudinal axis at right angles to the axis of rotation of the associated turbine 3 and each engine is supported in such a way that it can move bodily in directions parallel with the common axis of the shafts of the turbines 3, i.e., from left to right and vice versa as viewed in FIGURE 2, to accommodate thermal expansion and contraction of the associated turbine 3 and also to move bodily in directions at right angles to the common axis of the shafts of the turbines 3, i.e., from front to back and vice versa as viewed in FIGURES 1 and 2 to accommodate its own thermal expansion and contraction. The supporting means for permitting these movements is shown in FIGURES 3 and 4. Each engine 4 is supported in a cradle comprising a yoke 5 adjacent the air inlet of the engine and a similar yoke 5 adjacent the exhaust pipe thereof, which if the engine had been used in an aircraft would have led to the jet pipe. The two yokes 5 are interconnected on each side of the engine by a longitudinally-extending member 15. The engine 4 is held in the cradle by a three-point mounting comprising a trunnion 10 extending from each side of the engine casing in or near the transverse plane containing the centre of gravity of the engine and located in a trunnion bearing in the adjacent side member 15. The third point of the three-point mounting is a link 11 pivotally connected at one end to the front yoke 5 and at the other end to the engine casing. The cradle is suspended at four points by chains 14 from four stanchions 12 mounted on a bed-plate 13. The exhaust pipe is connected by a bellows 16 to a collar 17, carried on the end of a divergent casing 18 which in turn is connected to the inlet volute casing 19 of the associated turbine 3. The collar 17 is connected at each side by a bar 20 extending from the rear yoke 5 to the near end of the adjacent side member 15 and is supported by a pedestal 21 on which the collar 17 is free to move in a direction parallel to the longitudinal axis of the engine 4. The casings 18 and 19 are likewise supported on a pedestal 23 adjacent a connecting flange 22 therebetween. Thus axial expansion and contraction of the engine 4 and the casings 18 and 19 are accommodated by the cradle swinging longitudinally on the chains 14 and by the collar 17 and the flange 22 moving on the top of the pedestals 21 and 23 respectively. Similarly expansion and contraction of the turbine casing in a direction at right angles to the axis of the engine 4 is accommodated by the sliding of the flange 22 and the collar 17 on the pedestals 21 and 23 and also by the engine and the cradle swinging bodily laterally on the chains 14. The bars 20 transmit the longitudinal movement of the casing 18 directly to the cradle.

Figure 5A:
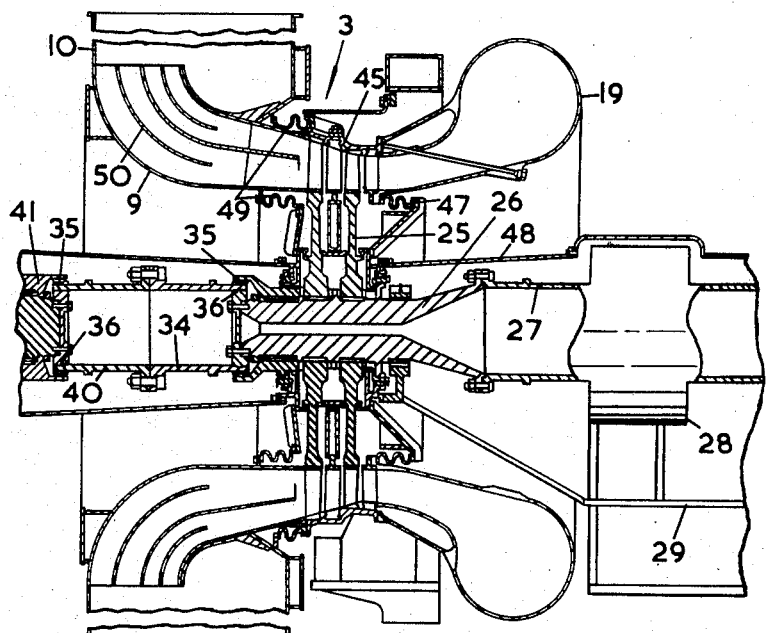
FIGURES 5A, 5B, 5C and 5D are successive portions from left to right of a sectional view on the line V—V in FIGURE 2 through the turbines and coupled shafts of the power units comprising the power plant.
Figure 5B:
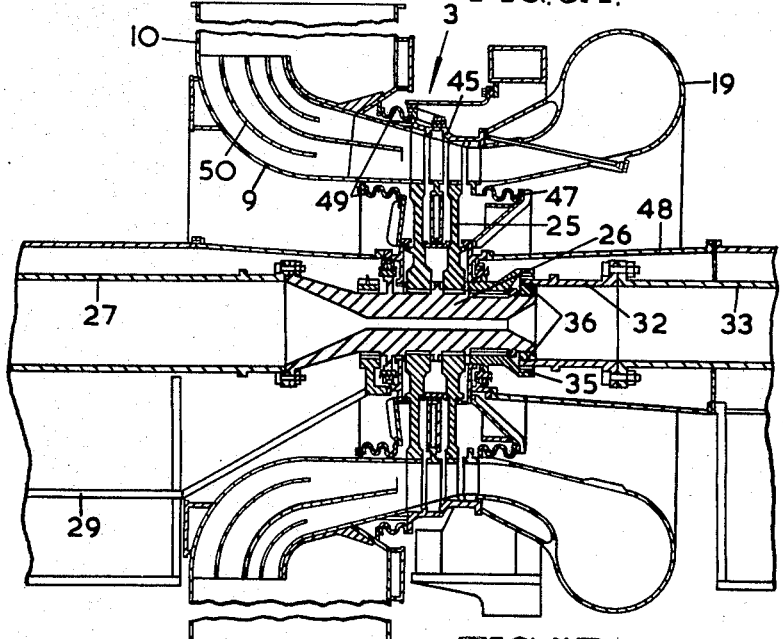

It is also an essential feature of the invention that the power plant is constructed from a number of units each comprising at least one turbine supplied by its own gas generator. In this example the plant is constructed from a pair of units, each including a pair of turbines 3. These are shown in FIGURES 5A, 5B, 5C and 5D. FIGURES 5A and 5B together show the turbines of one unit and FIGURES 5C and 5D together show the turbines of the adjacent unit. Each turbine comprises a rotor assembly 25 mounted on a shaft 26. The two shafts 26 of a unit are connected together by a shaft 27. Each shaft 27 is mounted in a thrust bearing 28, which in turn is mounted on a fixed pedestal 29, for the purpose of accommodating the axial thrust exerted by the turbines 3. Each shaft 26 is supported in a bearing carried by rigid structure forming part of the adjacent pedestal 29.

Figure 5C:
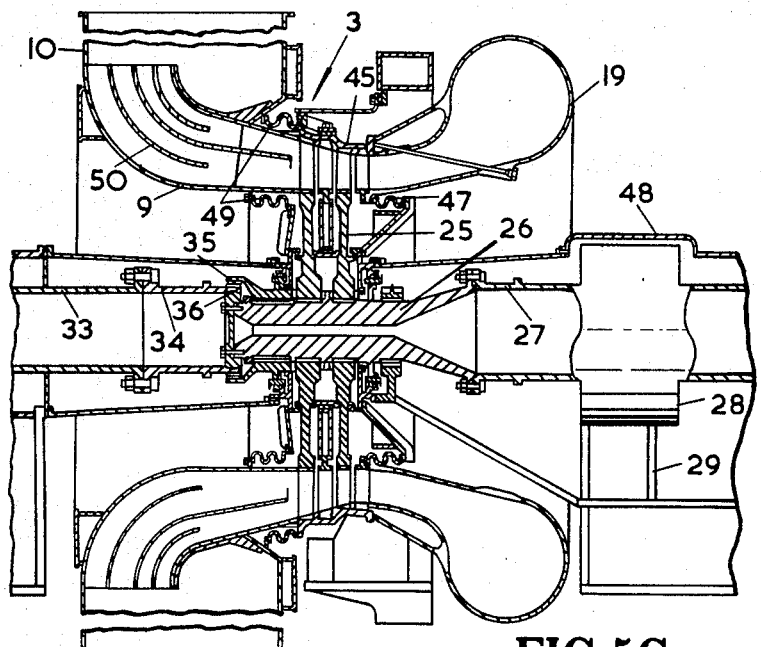

The right-hand end of the shaft 26 of the right-hand turbine of the first unit (see FIGURE 5B) is connected by a short tubular shaft 32 to a longer tubular shaft 33, which at its right-hand end is connected by a short tubular shaft 34 to the left-hand end of the shaft 26 of the left-hand turbine of the second unit (see FIGURE 5C). The connections between the shafts 26 and the shafts 32, 34 include splines 35 to transmit torque therebetween and also part-spherical convex and concave bearing surfaces 36 to permit a small amount of axial misalignment of the shafts 26 of adjacent units to be accommodated. In this way the bearing pedestals 29 do not have to be aligned with extreme accuracy.

Connecting shafts similar to shafts 32 to 34 are provided between each pair of units where more than two are provided. The extreme left-hand end of the interconnected units, that is the left-hand end of shaft 26 in FIGURE 5A, is provided with a similar connecting shaft 34, including splines 35 and part-spherical bearing surfaces 36. This shaft 34 is connected to another hollow shaft 40 which is connected to a coupling 41, carried on the end of the driven shaft of the generator 2. The shaft 40 and the coupling 41 are also provided with splines 35 and part-spherical bearing surfaces 36. The extreme right-hand shaft 26, i.e., the shaft 26 shown in FIGURE 5D is connected by a shaft 42 to a gear box 43, mounted on a pedestal 44 and which will be described hereinafter.

The stator casing 45 of each turbine 3 is attached to the inlet volute 19 also shown in FIGURES 1 to 3. The volute 19 is connected by a bellows 47 to a casing 48, provided around the shafts 26, 27, 32 and 34. The outlet of the stator casing 45 is connected by bellows 49 to the exhaust gas outlet volute 9, also shown in FIGURES 1 and 2, in which guide vanes 50 are provided to assist the leading of the exhaust gases to the exhaust pipes 10. The provision of the bellows 47 permits axial movement of the volute 19 and this is accommodated by the lateral sliding of collar 17 and the flange 22 on the pedestals 21 and 23 respectively and by the suspension of the associated engine and the cradle as shown in FIGURE 3.

Figure 5D:
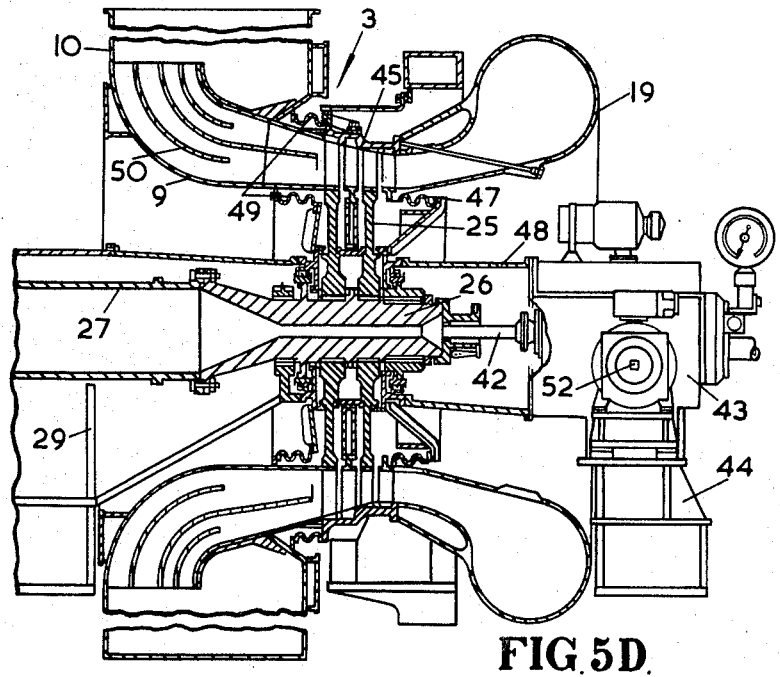

Turning now to the gear box 43, shown in FIGURE 5D, this provides a drive from a shaft 52 of an auxiliary motor to the shaft 42, whereby the whole turbine assembly can be rotated during cooling immediately after the power plant has been shut down. The gear box 43 may also provide a drive from the shaft 42 for auxiliaries including a tachometer and a pump for supplying lubricating oil to the bearings of the turbines 3 and the generator.

Figure 6:
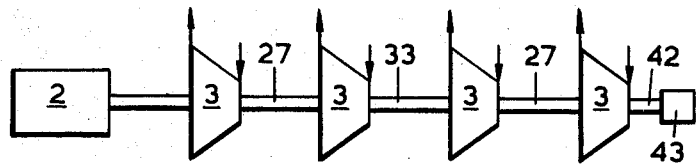
FIGURE 6 is a diagram showing the arrangement of the turbines shown in FIGURES 5A, 5B, 5C, and 5D.
Figure 7:
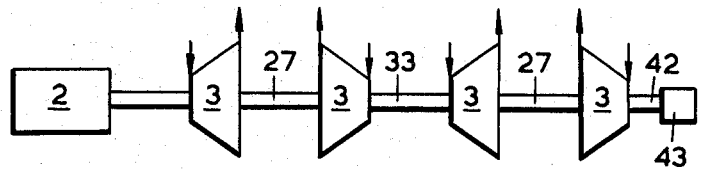
FIGURES 7 to 11 are diagrams showing alternative arrangement to that shown in FIGURE 6.
Figure 8:
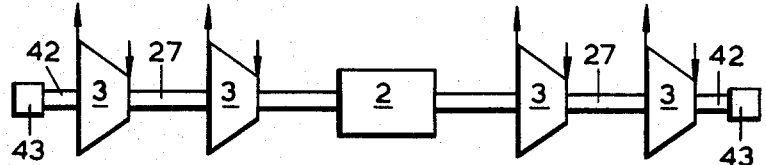
Figure 9:
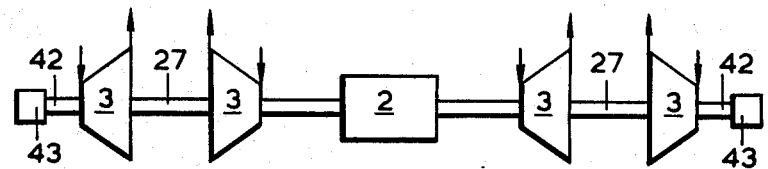
Figure 10:
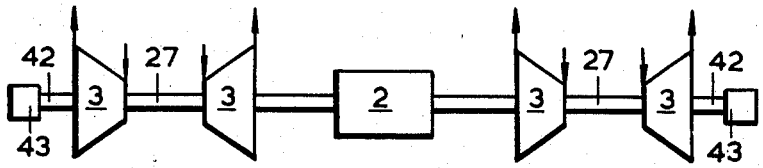
Figure 11:
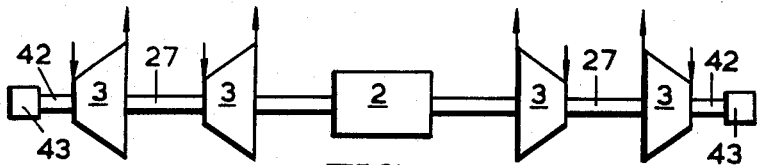

Many arrangements of the turbines 3 are possible and some illustrations of how the two turbines of each of two units can be arranged are shown diagrammatically in FIGURES 6 to 11. In FIGURE 6, the four turbines 3 are arranged, as shown in FIGURES 1, 2 and 5, at the same end of the generator 2 and all of the same hand, that is the inlet of each turbine is at the right-hand side and the outlet is at the left-hand side thereof. In FIGURES 6 to 11 the same references for similar components have been used as in FIGURES 1, 2 and 5. In FIGURE 7 the two turbines of each unit are of opposite hands, that is one of the turbines is a mirror image of the other, whereby the two outlets are adjacent each other. Alternatively, the two inlets could be adjacent each other. The arrangements shown in FIGURES 6 and 7 may also be modified by making the two turbines of one unit of the same hand and the two turbines of the other unit of opposite hands. Any of these arrangements may be used according to the disposition of inlet and outlet ducting found to be most suitable in a particular installation. By having the turbines of one or more units of opposite hands, the axial thrust exerted on the coupled shafts is reduced and therefore the thrust bearings can be smaller than they need to be in the arrangement shown in FIGURE 6. Although two separate thrust bearings 28 have been shown in FIGURES 5A and 5C, a single thrust bearing arranged to accommodate the total axial thrust could be located at any desired position in the coupled shafts.

FIGURES 8 to 11 show how the turbines 3 can be arranged in units on opposite ends of the generator 2. As before, the turbines may all be of the same hand as in FIGURE 8. Alternatively the turbines of each unit may be of opposite hands as shown in either FIGURE 9, where the outlets are adjacent, or in FIGURE 10, where the inlets are adjacent. In yet another arrangement, shown in FIGURE 11, the turbines at one end of the generator 2 are of one hand and the turbines at the other end of the generator 2 are of the opposite hand. Other arrangements are possible, for example the turbines of the unit at one end of the generator 2 can be of opposite hands and the turbines of the unit at the other end of the generator 2 can be of the same hand. Any of these arrangements can be used depending upon the duct arrangements desired. Also by using one or more turbines of opposite hands the total axial thrust will be reduced. In FIGURES 8 to 11 two gear boxes 43 are provided, one at each end of the coupled shafts, this enabling the barring motor to be applied from one end and the aforesaid accessories to be driven from the opposite end. If preferred, only one gear box 43 need be provided.

The several arrangements of turbines 3 shown in FIGURES 6 to 11 comprise two units each including two turbines. It is within the scope of the invention for the power plant to comprise two or more power units, each comprising any number of turbines and their associated gas generators.

A gas turbine power plant according to the invention has the following advantages:

(1) The power plant may be given a required power output by the use of an appropriate number of power units.

(2) By using gas turbine engines as the gas generators, the plant can quickly be brought to full power.

(3) The engines can be aircraft jet propulsion engines of known type and thus no special design for the gas generator is necessary.

(4) If one gas generator should fail, the remainder will continue to operate giving reduced power output to the driven shaft.

(5) The units can be arranged with respect to each other and with respect to the apparatus being driven, in various ways according to the shape and size of the building, in which the plant is to be accommodated.

(6) The end thrust can be taken by a single thrust bearing arranged at a suitable position in the plant.

(7) Accessories for all the turbines can be arranged to be driven from one suitable position in the length of the coupled shafts of the units and the latter may be driven by an auxiliary motor from the said one position on shutdown of the plant, as aforesaid.

(8) By providing flexible couplings at the ends of the shafts, the supporting means for the shafts of the units and the driving shaft do not have to be aligned accurately with respect to each other.

What I claim as my invention and desire to secure by Letters Patent of the United States is:

A gas turbine power plant including a plurality of power units, each comprising a power turbine, a shaft on which said power turbine is mounted, a flexible coupling at at least one end of said shaft, whereby said shaft can be drivingly coupled to a shaft of an adjacent unit in substantially axial alignment therewith, a gas turbine jet engine including a rotary compressor and a turbine coaxial with and coupled to drive said compressor, said jet engine being supported with the axis of its turbine and compressor offset from the axis of said power turbine shaft, a delivery duct for conveying gases discharged by said jet engine to said power turbine, supporting means for said power turbine shaft and supporting means for said jet engine, the latter supporting means comprising a pair of yoke members each surrounding said jet engine at positions spaced apart axially thereof, a pair of frame members interconnecting said yoke members and each extending parallel with the axis of said jet engine along each side thereof, said yoke members and said frame members together forming a cradle in which said jet engine is mounted, a trunnion mounting extending from each said frame member, said trunnion mountings together supporting said jet engine at a pair of diametrically opposite positions thereon, a link interconnecting one of said yoke members and an adjacent part of said jet engine, said trunnion mountings and said link together providing a three-point mounting locating said jet engine in said cradle, fixed structure including four stanchions each positioned adjacent a different end of each of said frame members, and a supporting member connected between each said stanchion and the adjacent frame member by which said cradle is suspended with said frame members substantially horizontal and to permit bodily movement of said jet engine and said cradle as a resultant of components of movement in a direction parallel with the axis of said power turbine shaft to accommodate axial expansion and contraction of said power turbine and in a direction to accommodate expansion and contraction of said jet engine axially of its turbine and compressor, the power plant also including a power output shaft coupled to the shaft of one of said units.

References Cited by the Examiner

UNITED STATES PATENTS

| | | | |
|---|---|---|---|
| 1,684,082 | 9/1928 | Allen | 290—4 X |
| 2,457,425 | 12/1948 | Wolfard. | |
| 2,529,955 | 11/1950 | Morley. | |
| 2,650,753 | 9/1953 | Howard et al. | 60—39.32 X |
| 2,727,621 | 12/1955 | Fillion. | |
| 2,929,207 | 3/1960 | Peterson | 60—39.15 |
| 2,933,892 | 4/1960 | Howard | 60—39.16 |
| 2,992,809 | 7/1961 | Herbage | 60—39.32 |
| 3,048,018 | 7/1962 | Nicolin | 60—39.16 |

FOREIGN PATENTS

| | | |
|---|---|---|
| 1,254,500 | 1/1961 | France. |
| 632,493 | 11/1949 | Great Britain. |
| 659,714 | 10/1951 | Great Britain. |

JULIUS E. WEST, *Primary Examiner.*

MARK NEWMAN, *Examiner.*